United States Patent [19]

Gerblinger et al.

[11] Patent Number: 5,430,428
[45] Date of Patent: Jul. 4, 1995

[54] HIGH-TEMPERATURE SENSOR MADE OF METAL OF THE PLATINUM GROUP

[75] Inventors: Josef Gerblinger, Augsburg; Hans Meixner, Haar, both of Germany

[73] Assignee: Siemens Aktiengesellschaft, Munich, Germany

[21] Appl. No.: 87,811
[22] PCT Filed: Feb. 3, 1992
[86] PCT No.: PCT/EP92/00223
§ 371 Date: Jul. 15, 1993
§ 102(e) Date: Jul. 15, 1993
[87] PCT Pub. No.: WO92/15101
PCT Pub. Date: Sep. 3, 1992

[30] Foreign Application Priority Data

Feb. 15, 1991 [EP] European Pat. Off. ............ 91102184

[51] Int. Cl.⁶ .................. H01C 3/04; H01C 1/012; G01K 7/18
[52] U.S. Cl. ........................... 338/25; 338/314; 338/257; 338/293; 374/185; 427/103; 427/126.2
[58] Field of Search ............... 338/25, 314, 256, 257, 338/262, 269, 275, 293; 374/185; 427/103, 126.2

[56] References Cited

U.S. PATENT DOCUMENTS

| 4,028,657 | 6/1977 | Reichelt | 338/314 |
| 4,050,052 | 9/1977 | Reichelt et al. | 338/314 |
| 4,103,275 | 7/1978 | Diehl et al. | 338/25 |
| 4,282,507 | 8/1981 | Tindall et al. | 338/25 |
| 4,368,453 | 1/1983 | Herden et al. | 338/275 |
| 4,369,656 | 1/1983 | Ueno et al. | 338/25 |
| 4,909,079 | 3/1990 | Nishimura et al. | 338/269 |
| 5,168,256 | 12/1992 | Ishiguro et al. | 338/25 |

FOREIGN PATENT DOCUMENTS

| 0245092 | 11/1987 | European Pat. Off. . | |
| 3603757 | 8/1986 | Germany . | |
| 0131001 | 6/1991 | Japan | 338/25 |
| 403265101 | 11/1991 | Japan | 338/25 |
| 2171253 | 8/1986 | United Kingdom . | |
| 87/05146 | 8/1987 | WIPO | 338/25 |
| 89/03033 | 4/1989 | WIPO . | |

OTHER PUBLICATIONS

Thin-Film Temperature sensors deposited by radio frequency cathodic sputtering, Godefrey, et al. J. Vac. Sci. Tech. A. Vo. 5, No. 5, pp. 2917-2923 (1987).

Primary Examiner—Diego F. F. Gutierrez
Attorney, Agent, or Firm—Hill, Steadman & Simpson

[57] ABSTRACT

A rapid temperature sensor formed of a metal from the platinum group is provided. The rapid temperature sensor includes a substrate over which a platinum resistive layer is provided. A double layer, forming a passivation layer, is provided over the platinum resistive layer to prevent oxidation. The double layer includes a ceramic layer and a glass layer. The double layer prevents oxygen from reaching the platinum resistive layer even at temperatures up to 1,000° C.

18 Claims, 1 Drawing Sheet

HIGH-TEMPERATURE SENSOR MADE OF METAL OF THE PLATINUM GROUP

BACKGROUND OF THE INVENTION

The present invention relates to a rapid temperature sensor made of metal of the platinum group for high-temperature sensor technology, in particular for use in motor-vehicle exhaust-gas monitoring technology.

Many applications in the field of high-temperature sensor technology (for example, emission-controlled combustion) require sensors which can detect the temperatures in their environment with time constants of less than 100 ms. In the field of exhaust-gas sensor technology it is, for example, necessary to keep the gas-sensitive elements at a constant temperature of approximately 1,000° C. The exhaust-gas temperature variations must be detected as rapidly as possible in order to be able to control the heating elements integrated on the sensor chip in such a way that the temperature of the gas-sensitive layer remains virtually constant.

For application temperatures of up to 1,000° C., platinum/platinum-rhodium or nickel/chromium-nickel thermocouples have hitherto been used. These couples have, however, two crucial disadvantages. On the one hand, they cannot be integrated on hybrid components and, on the other hand, they have relatively long response times to temperature changes in their environment. Temperature sensors which are made of metals of the platinum group and which have been screen-printed or produced using other thin-film technologies (PVD or CVD processes) have hitherto been available for use only up to a maximum of 850° C. since, starting from this temperature as a maximum, the platinum metals form both stable and volatile oxides which result in a resistance drift of the temperature sensor.

To protect the temperature sensor made of metal of the platinum group against oxidation and consequently prevent the resistance drift of the sensor, the metal of the platinum group is covered with various protective layers. For example, GB 2 171 253 discloses a temperature sensor which is made of platinum metal and provided with an aluminum oxide protective layer.

JP-A 63269502 discloses a platinum resistance film having a silicon nitride protective layer.

A platinum layer resistance having a titanium dioxide/silicon dioxide double layer is to be found in German Offenlegungsschrift 36 03 757.

An article by J. C. Godefreuy et al. in J. Vac. Sci. Technol. A 5 (5), 1987, pages 2917 to 2923 discloses a platinum thin-film temperature sensor which has a complicated multilayer structure comprising a platinum thin film embedded in aluminum oxide.

A disadvantage of the known sensors is that, despite passivation layers and protective layers, an oxidation of the platinum which results in the unacceptable drift of the temperature sensor is observed at temperatures of over 850° C. The oxidation can be attributed, in particular, to cracks in the passivation layers, which cracks develop during cooling from high temperatures down to room temperature because of the different coefficients of thermal expansion of the materials used for the sensor.

During cooling, glass layers to be applied as passivation layer using thick-film technology also form cracks which permit access of oxygen and consequently an oxidation of the platinum.

SUMMARY OF INVENTION

The object of the present invention is to provide a temperature sensor which is made of metal of the platinum group for a temperature range of up to 1,000° C., which temperature sensor has a short response time, a simple, readily producible structure and a stable measurement behavior without resistance drift even at temperatures of over 850° C.

According to the invention, this object is achieved by a rapid temperature sensor made of metal of the platinum group including a platinum resistive layer applied to a ceramic substrate. A passivation layer is also provided, and is applied over the platinum resistive layer. The passivation layer is a double layer having both a ceramic layer and a glass layer.

Additional features and advantage of the present invention are described, and will be apparent from, the detailed description below and from the drawings.

Further embodiments of the invention and uses, in accordance with the invention, of the temperature sensor are to be found in the subordinate claims.

DESCRIPTION OF THE PREFERRED EMBODIMENTS

Figure 1:
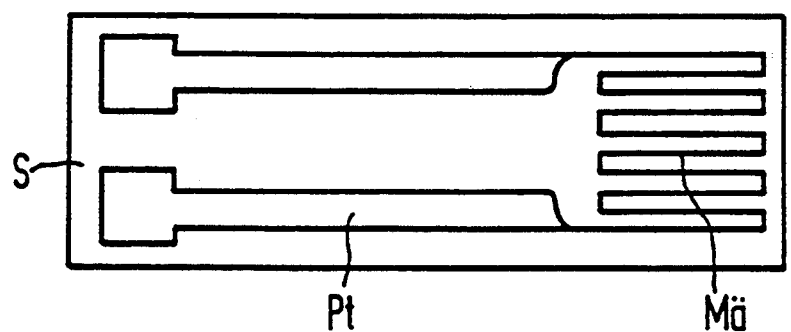
FIG. 1 illustrates a top view of a platinum resistive layer provided on a substrate in accordance with the principles of the present invention.

As illustrated in FIG. 1, a substrate S is provided. A platinum resistive layer Pt having a thickness of, for example, 5 mm is applied to the substrate S. The platinum resistive layer Pt is partially formed meanders Mä which form the actual measuring resistance.

Figure 2:
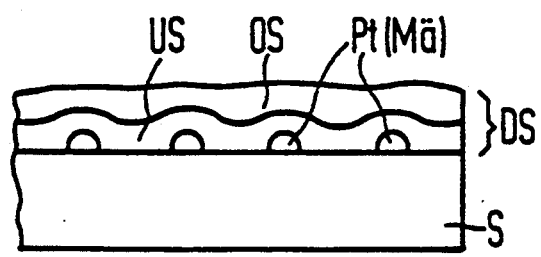
FIG 2 illustrates, diagrammatically, a sectional view through a temperature sensor manufactured in accordance with the principles of the present invention.

As illustrated in FIG. 2, a temperature sensor manufactured in accordance with the principles of the present invention includes the meander structure Mä. The platinum resistive layer, or conductor tracks, Pt applied to the substrate S can include, for example, aluminum oxide. The platinum resistive layer Pt is covered by a passivation layer. The passivation layer, or double layer DS includes a lower layer US and an upper layer OS. Advantageously, the lower layer US is a glass layer, and the upper layer OS is a ceramic layer. It is also contemplated that the lower layer US can be a ceramic layer while the upper OS can be a glass layer.

In temperature sensors, a platinum resistive layer, generally in the form of meanders, is applied using thick- or thin-film processes to the substrates (for example, made of $Al_2O_3$) normally used in microsystem technology. The oxidation of the metals of the platinum group is suppressed by a passivation which is applied to the surface of the temperature sensor. In order to obtain the shortest possible response times of the temperature sensor with time constants of less than 100 ms despite the passivation, the passivation layer is, according to the invention, produced as a double layer which is as thin as possible (typical layer thicknesses in the range from 1 to 15 μm).

Particularly suitable for the ceramic layer are compounds of metals M with nitrogen N (metal nitride; for example $Si_3N_4$), carbon C (metal carbide) or oxygen O (metal oxide; for example $Al_2O_3$), boron (metal borides), silicon (metal silicides) or combinations of silicides, nitrides, carbides, borides or oxides.

Glasses of any kind, for example silicate glasses, which are commercially available as pastes for thick-film technology, are suitable for the glass layer.

In the double layer in accordance with the invention, the layer sequence of ceramic layer and glass layer is interchangeable, so that the glass layer or the ceramic layer may be applied directly on top of the platinum resistive layer.

In the platinum/glass/ceramic arrangement, the glass layer acts as a buffer layer which softens at fairly high temperatures and thus reduces or prevents the development of stresses between the ceramic layer and the layers situated underneath. Despite the high temperature interval, no cracks are observed in the ceramic layer during the operation of the temperature sensor from room temperature to 1,000° C. because stresses do not occur.

In the platinum/ceramic/glass arrangement, the glass layer serves as a sealing layer which likewise softens at fairly high temperatures and in this process is capable of penetrating any cracks which form in the ceramic layer situated underneath, thereby sealing them. Even during cooling, the glass continues to adhere in the gaps and cracks which have occurred in the ceramic layer and ensures an oxygen-proof passivation due to said double layer.

In this way, oxygen is prevented from passing through the passivation to the surface of the metal of the platinum group and a metal oxide layer is prevented from developing between the metal of the platinum group and the passivation. In selecting the passivation, however, care must be taken to ensure that no reactions occur between the passivation and the metal of the platinum group used as temperature sensor, even at the high application temperatures. The latter would also result in irreparable resistance drift of the temperature sensor. There is no danger of chemical reactions between resistive layer and passivation layer in the case of the direct arrangement of the glass layer on top of the platinum layer. It is only when the platinum layer comes into contact with the ceramic layer that the ceramic layer must not contain oxygen and at the same time also be ion-conducting. Only those oxides are permitted as ceramic which contain only firmly bound oxygen which is incapable of platinum oxide formation.

Whereas the glass layer is produced using a thick-film process, for example by printing on a paste containing glass particles and then firing it, the ceramic layer can be produced either using thick-film or thin-film technology. A ceramic green film can first be produced and then fired, or the ceramic is produced directly by a plasma or gas-phase deposition process, for example by PVD or CVD processes. Sputtering and vapor-deposition processes are also suitable. Typical layer thicknesses for the ceramic layer are between 1 and 10 $\mu m$, while the chosen layer thickness of the glass layer is between 5 and 10 $\mu m$. A greater layer thickness may be necessary for the lower sublayer resting directly on the resistive layer and the substrate because of the uneven substrate surface, normally ceramic, in order to ensure a uniform and impermeable layer.

In the case of a temperature sensor which is made of metal of the platinum group and is produced using thick-film technology and in which the first passivation sublayer is produced using thin-film technology to achieve a minimum response time of the temperature sensor, application of a sealing layer to the passivation layer in order to seal cracks which have arisen in the passivation layer after heating and then cooling for the purpose of heat-treating the sensor blank virtually produces a passivation layer produced using thick-film technology.

The ceramic layer is produced from a metal/non metal compound which exhibits no interaction with oxygen.

In addition, the ceramic layer is produced from a metal/non metal compound which is impermeable to oxygen.

Finally, the first (lower) passivation layer is produced from a metal/non metal compound which does not exhibit any interaction with metals of the platinum group.

The invention provides for the first time a rapid temperature sensor which is suitable for temperatures of up to 1,000° C., in particular for the interval from 850° to 1,000° C. and which does not exhibit any resistance drift even when used in an oxygen-containing atmosphere and therefore provides reliable and dependable measurements even in the case of by long service life. It consequently becomes possible for the first time to measure exhaust-gas temperatures of internal combustion engines immediately downstream of the combustion chamber in order to control other gas sensors optimally using the measurements obtained and, consequently, to make possible an optimum combustion with maximum energy utilization accompanied by minimum pollutant discharge. It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A rapid temperature sensor made of metal of the platinum group comprising: a platinum resistive layer applied to a ceramic substrate and a passivation layer applied over and completely covering and passivating the platinum resistive layer, the passivation layer being a double layer having both a ceramic layer and a glass layer.

2. The rapid temperature sensor as claimed in claim 1, wherein the glass layer is produced using thick-film technology.

3. The rapid temperature sensor as claimed in claim 1, wherein the material of the ceramic layer is selected from the group consisting of the nitrides, borides, carbides, oxides and silicides of metals.

4. The rapid temperature sensor as claimed in claim 1, wherein the glass layer comprises a silicate glass layer.

5. The rapid temperature sensor as claimed in claim 1, wherein the ceramic layer is formed using thick- or thin-film technology and has a thickness of approximately 1 to 10 $\mu m$.

6. The rapid temperature sensor as claimed in claim 1, wherein said glass layer comprises a glass thick film applied on top of the platinum resistive layer and said ceramic layer comprises a 1 to 10 $\mu m$ thick layer of ceramic material on top of said glass thick film.

7. The rapid temperature sensor as claimed in claim 1, wherein said ceramic layer comprises a 1 to 10 $\mu m$ thick layer of ceramic material on top of the platinum resistive layer and wherein said glass layer is applied on top of said ceramic layer using thick-film technology.

8. A rapid temperature sensor made of a metal from the platinum group for use in a motor vehicle gas exhaust monitoring technology and suitable for exposure to temperatures of up to 1000° C., comprising:
a ceramic substrate;
a platinum resistive layer applied to the ceramic substrate; and
passivation layer means, applied over the platinum resistive layer, for preventing oxidation and resistance drift of the rapid temperature sensor at temperatures of up to 1000° C., said passivation layer means being formed by double layer having a first layer of ceramic and a second layer of glass.

9. A rapid temperature sensor as claimed in claim 8, wherein the second layer is formed using thick-film technology.

10. A rapid temperature sensor as claimed in claim 8, wherein the first layer is selected from the group consisting of nitrides, borides, carbides, oxides, and silicides of metals.

11. A rapid temperature sensor as claimed in claim 8, wherein the second layer of glass comprises a layer of silicate glass.

12. A rapid temperature sensor as claimed in claim 8, wherein the first layer of ceramic is formed using at least one of thick and thin-film technology, the first layer having a thickness ranging from approximately 1 to 10 µm.

13. A rapid temperature sensor as claimed in claim 8, wherein the second layer of glass comprises a glass thick film layer applied over the platinum resistive layer, and wherein the first layer of ceramic is a layer of ceramic material having a thickness ranging from 1 to 10 µm, applied over the glass thick film layer.

14. A rapid temperature sensor as claimed in claim 8, wherein the first layer comprises a 1 to 10 µm thick layer of ceramic material applied over the platinum resistive layer, and wherein the second layer comprises glass applied over the thick layer of ceramic material using thick-film technology.

15. A method for manufacturing a rapid temperature sensor for use in motor vehicle gas exhaust monitoring technology for measuring temperatures ranging from 850° to 1,000° C., comprising the steps of:
providing a ceramic substrate;
applying a platinum resistive layer to the ceramic substrate; and
applying a passivation layer over the platinum resistive layer, and forming the passivation layer of a double layer consisting of a ceramic layer and a glass layer.

16. A method as claimed in claim 15, wherein the step of applying said passivation layer comprises the steps of forming said ceramic layer by applying a 1 to 10 µm, thick layer of ceramic material using at least one of thick-film and thin-film technology over the platinum resistive layer, and applying said glass layer over said ceramic layer.

17. A method as claimed in claim 15, wherein the step of applying said passivation layer comprises the steps of applying said glass layer over the platinum resistive layer and forming said ceramic layer by applying a 1 to 10 µm thick layer of ceramic material over the glass layer.

18. A method as claimed in claim 15, wherein the step of applying said passivation layer comprises the steps of applying a 1 to 10 µm thick layer of ceramic material over the platinum resistive layer, and applying said glass layer using thick-film technology over the thick layer of ceramic material.

* * * * *